United States Patent
Chikazawa

[11] Patent Number: 6,052,166
[45] Date of Patent: *Apr. 18, 2000

[54] LCD PROJECTOR COMPRISING LIGHT SENSOR AND CORRECTION CIRCUIT

[75] Inventor: Yoshiharu Chikazawa, Kanagawa-ku, Japan

[73] Assignee: Thomson multimedia S.A., Boulogne Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,637

[22] Filed: Apr. 10, 1997

[30] Foreign Application Priority Data

Apr. 13, 1996 [GB] United Kingdom ............... 96/07703

[51] Int. Cl.$^7$ ........................ G02F 1/133; G03B 21/14; G03B 3/00; G03F 3/08
[52] U.S. Cl. ........................ 349/116; 353/97; 358/519
[58] Field of Search ........................ 358/518, 519; 349/116; 353/97, 1.1

[56] References Cited

U.S. PATENT DOCUMENTS

| | | |
|---|---|---|
| 5,301,017 | 4/1994 | Murakami .......................... 348/645 |
| 5,315,378 | 5/1994 | Satou et al. ........................ 348/655 |
| 5,483,299 | 1/1996 | Minoura ............................ 348/745 |
| 5,488,492 | 1/1996 | Abe ................................... 358/518 |
| 5,519,518 | 5/1996 | Watanabe et al. .................. 359/40 |
| 5,592,239 | 1/1997 | Hara et al. ......................... 348/771 |
| 5,597,223 | 1/1997 | Watanabe et al. .................. 353/97 |

FOREIGN PATENT DOCUMENTS

| | | | |
|---|---|---|---|
| 0453030 | 10/1991 | European Pat. Off. | ...... H05B 41/392 |
| 2237400 | of 0000 | United Kingdom | ............ G02F 1/133 |

OTHER PUBLICATIONS

Copy of search report.

*Primary Examiner*—James A. Dudek
*Assistant Examiner*—Toan Ton
*Attorney, Agent, or Firm*—Joseph S. Tripoli; Joseph J. Laks; Joseph J. Kolodka

[57] ABSTRACT

Known LCD projectors, used for example in TV sets, can only be manually adjusted for the compensation of the changing color spectrum of the lamp due to its aging process. An LCD projector according to the invention further comprises an image sensor to measure the light intensity of the lamp. In a color adjusting circuit the image color is compensated as a function of the measured signal by controlling the LCD valve.

14 Claims, 2 Drawing Sheets

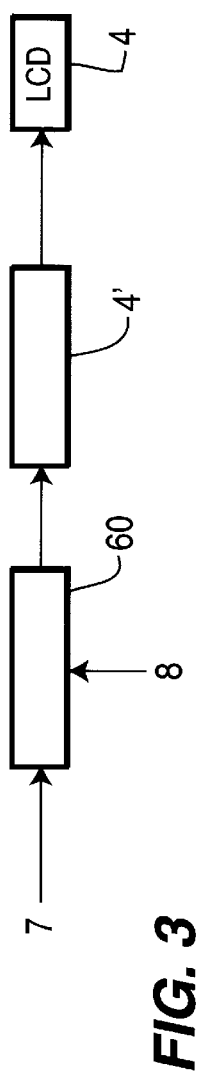
FIG. 3
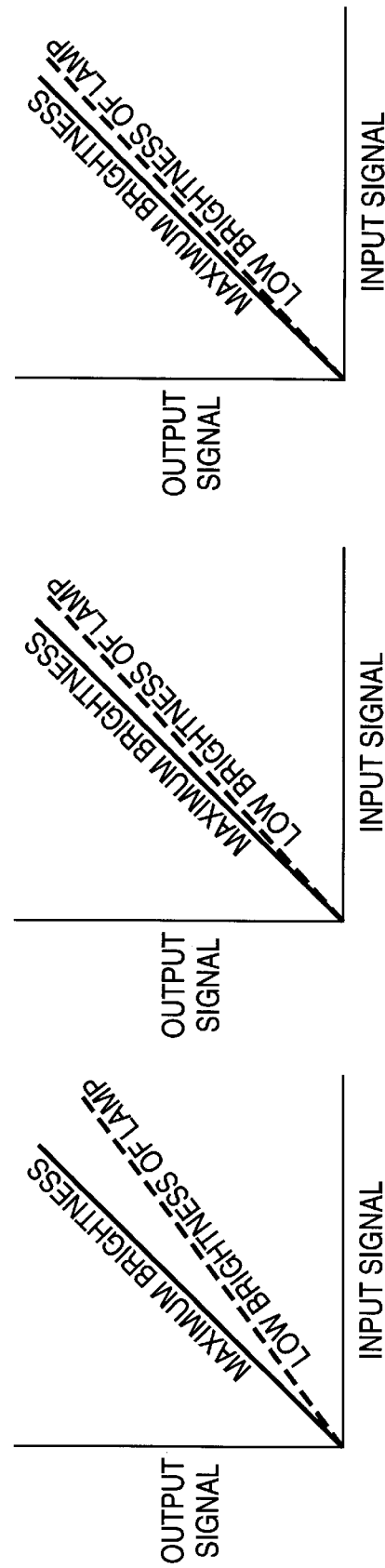
FIG. 6
FIG. 5
FIG. 4

LCD PROJECTOR COMPRISING LIGHT SENSOR AND CORRECTION CIRCUIT

BACKGROUND OF THE INVENTION

1. Field of the invention

The present invention relates to a projector more particularly to a projector comprising an illumination means, a collimating means and a controllable transmissive type display valve such as a LCD valve.

2. Discussion of the background

LCD projectors, for example when used as a TV set, are known and can be realized by a projector system having a lamp, light valves, optics and a screen. The light valves are realized, for example, by a LCD valve as in the "Sharp TFT LCD projector XV-P3". The light valve, ie, the LCD valve, includes a transparent means, where the transparency can be controlled as a function of the light intensity to be displayed by the projector. Further, the light of the lamp is characterized by the luminance and also by its color spectrum. This color spectrum depends on the luminance or the intensity of the light. Said luminance may change with the life time or operating time of the lamp. This in turn means that after a certain period of time, light luminance and therefore light color spectrum changes, which results in different image colors of the TV set. Todays projectors therefore have a manual adjustment function to change the image color by an user. But usually the user does not want to adjust the LCD projector of his TV set each time when he uses said TV set.

SUMMARY OF THE INVENTION

It is therefore an object of the invention to keep automatically a certain picture color independent of the luminance of the projector lamp.

The present invention relates to a projector with an illumination means, a collimating means and a controllable transmissive type display valve, wherein the projector further comprises a sensor for sensing the light intensity and a color adjustment circuit for controlling the valve based on the signals of said sensor. Usually, the collimating means of the projector are formed by, a collimator lens and the projector comprises projection lenses to project the image onto a screen.

Further the light sensor of the projector according to the invention is located between the collimating means and the valve. But it is also possible to locate the light sensor of the projector between the illumination means and the collimator means. The illumination means of the projector may comprise a lamp and a reflector.

The invention has the advantage that different light can be compensated automatically so that the picture color is always within a given range. Thereby a projector is realized, which is more convenient for a user. As the variation of light color with light intensity is compensated, brightness can be adjusted by varying the light intensity without influence on the image color. In this way power can be saved compared to known brightness controls. Further, the projector is cost effective, because it only uses one light sensor.

BRIEF DESCRIPTION OF THE DRAWINGS

A preferred embodiment of the invention is described with reference to the accompanying drawings, wherein:

FIG. 3 shows an embodiment of the adjustment circuit of FIG. 2, and

FIGS. 4–6 show different curves giving the advantages of the invention.

In the figures, the same references are used for the same means. Furthermore the transmissive type display valve is a liquid crystal display but the invention can be used with other transmissive type display valve.

DESCRIPTION OF THE PREFERRED EMBODIMENT

Figure 1:
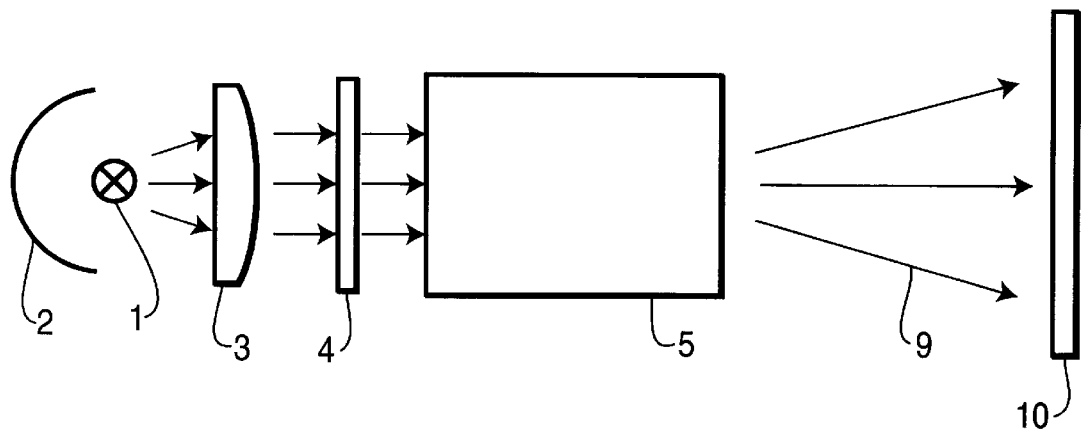
FIG. 1 shows a LCD projector according to the state of the art.

FIG. 1 shows a known LCD projector comprising a lamp 1 with a reflector 2, a collimator lens 3 followed by a LCD valve 4 used as light valves and projector lenses 5 to project an image onto a screen 10. The path of a light ray 9 between the projection lenses 5 and the screen 10 is shown schematically. In the known LCD projector the light intensity is adjusted manually (not shown).

Figure 2:
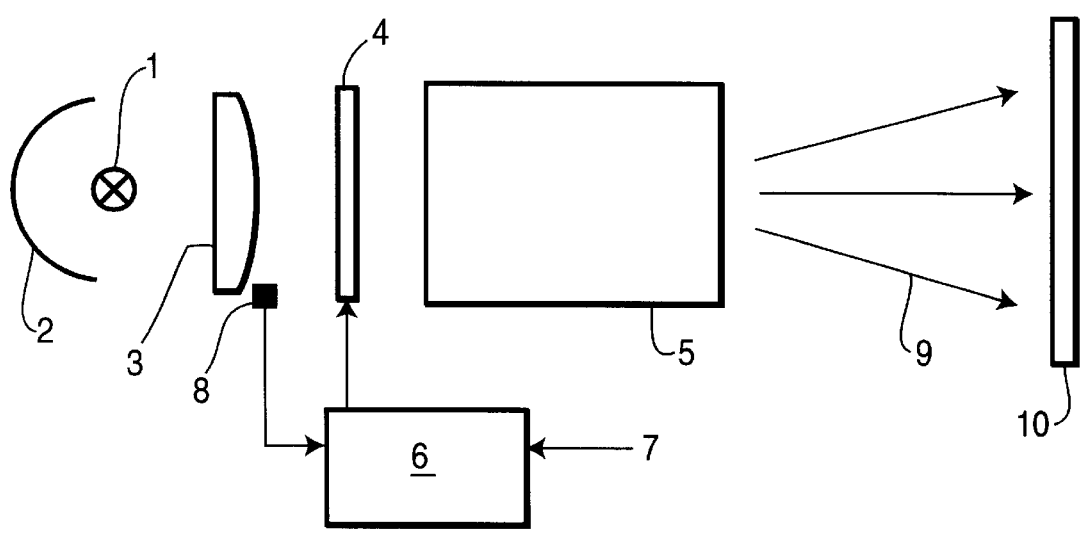
FIG. 2 shows a schematic of a LCD projector according to the invention.

FIG. 2 shows an LCD projector, used for example in TV sets, wherein a lamp 1 with a reflector 2 generates light incident upon a collimator lens 3. The parallel light after the collimator lens passes a LCD valve 4 which controls the light intensity in a pixelwise manner. Then the light controlled by the LCD valve 4 passes through projection lenses 5 so that an image is generated on a screen 10. The LCD valve 4 is controlled by a-color adjustment circuit 6, wherein an image signal 7 is input. Because the image color is a function of the light intensity delivered from the lamp 1, the light intensity is measured by a light sensor 8. The signal of the light sensor 8 is input to the color adjustment circuit 6 which adjusts the image color according to the kind of lamp 1 (light color of the lamp) and adjusts the image color as a function of the delivered light intensity. It is further possible to combine the function "color adjustment circuit" with a hue or tint circuit of a known projector.

Now, it will be explained more in detail with reference to FIGS. 3 and 4–6, how is realized the color adjustment. It is known that the cell transmissivity of a LC panel is controlled on RGB signal. The transmissivity is maximum at high luminance image signal. If lamp brightness became too low, light color of the lamp shifts to red. At that time, red signal must be reduced. So, as shown in FIG. 3, the color adjustment circuit comprises a variable amplifier 60 set before the known driving circuit 4' of the LCD valve 4. Variable amplifier gain is changed and controlled by the sensor output 8 of intensity or light from the lamp 1 as shown in FIG. 2. In FIGS. 4–6 giving one example of the case where the lamp light color shifts to red, gains of green and blue signals are also changed depending on color shift value of light.

γ correction may be done in the same way as above using a variable γ correction circuit.

Further the sensor can be arranged between the lamp 1 and the collimator lens 3 instead of the arrangement between the collimator lens 3 and the LCD valve 4 as given in FIG. 1.

It may be mentioned that the LCD valve 4 is shown only schematically. It can be realised e.g. as a color LCD panel or as three monochrome LCD panels for RED, GREEN, BLUE.

What is claim is:

1. A projector, comprising:

an illumination means for generating light;

a collimating means receiving the light and generating a parallel light;

a controllable valve for controlling the light intensity from the illumination means;

a sensor positioned before the controllable valve for sensing the light intensity from the illumination means; and, a variable color adjustment circuit receiving an output from the sensor and controlling a transmissivity of the valve based on the sensor output.

2. Projector according to claim 1, wherein the light sensor is located between the collimating means and the valve.

3. Projector according to claim 1, wherein the light sensor is located between the Illumination means and the collimator means.

4. Projector according to claim 1, further comprising projection lenses.

5. Projector according to claim 1, wherein the collimating means are formed by a collimator lens.

6. Projector according to claim 1, wherein the illumination means comprises a lamp and a reflector.

7. Projector according to claim 1, wherein the valve is a liquid crystal display.

8. A projector, comprising:

an illumination means for generating light;

a collimating means receiving the light and generating a parallel light;

a controllable valve for controlling the light intensity from the illumination means;

a sensor positioned before the controllable valve for sensing the light intensity from the illumination means; and, a variable $\gamma$ adjustment circuit receiving an output from the sensor and controlling a $\gamma$ correction of the valve based on the sensor output.

9. Projector according to claim 8, wherein the light sensor is located between the collimating means and the valve.

10. Projector according to claim 8, wherein the light sensor is located between the illumination means and the collimator means.

11. Projector according to claim 8, further comprising projection lenses.

12. Projector according to claim 8, wherein the collimating means are formed by a collimator lens.

13. Projector according to claim 8, wherein the illumination means comprises a lamp and a reflector.

14. Projector according to claim 8. wherein the valve is a liquid crystal display.

* * * * *